Oct. 3, 1933.  I. M. COPPOCK  1,928,882
AIRPLANE WHEEL
Filed July 19, 1930  2 Sheets-Sheet 1
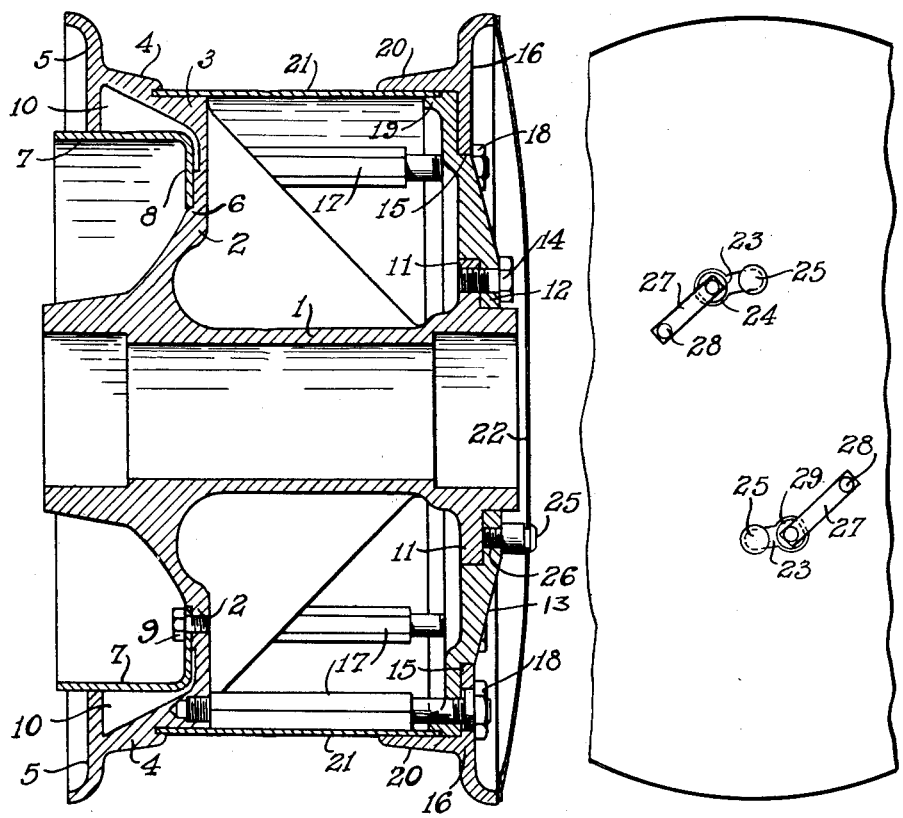
Fig.1
Fig.2.
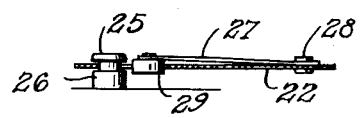
Fig.3.
Inventor,
Ira M. Coppock,
By Howard D. Smith.
His Attorney Oct. 3, 1933.  I. M. COPPOCK  1,928,882
AIRPLANE WHEEL
Filed July 19, 1930  2 Sheets-Sheet 2

Inventor,
Ira M Coppock,
By Howard S. Smith,
Attorney

Patented Oct. 3, 1933

1,928,882

UNITED STATES PATENT OFFICE 1,928,882

AIRPLANE WHEEL

Ira M. Coppock, Dayton, Ohio, assignor to The Variety Manufacturing Company, Dayton, Ohio, a corporation of Ohio Application July 19, 1930. Serial No. 469,089

1 Claim. (Cl. 301—37)

This invention relates to new and useful improvements in airplane wheels.

It is one of the principal objects of my invention to provide an airplane wheel which is so constructed that heat from the brake drum cannot affect the inner tube of the pneumatic tire. This is accomplished by the use of an insertible drum, with an air pocket between the latter and the wheel wall to resist the passage of heat from the drum to the inner tube.

It is another object of my invention to provide an airplane wheel that is easy to assemble and disassemble because it is held together by bolts and nuts, thus facilitating the making of repairs.

It is a further object of my invention to provide a stream line disc that is easily applied to, and removed from, the outer portion of the wheel.

Other important and incidental objects will be brought out in the following specification and particularly set forth in the subjoined claims.

Figure 4:
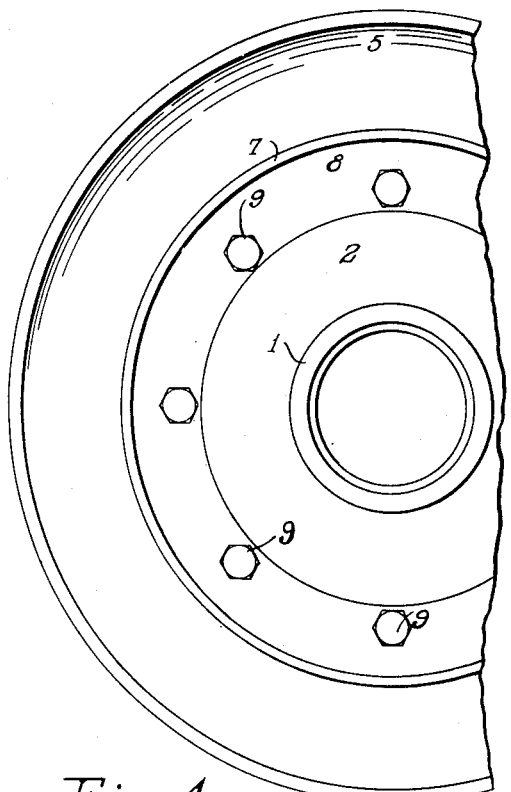
Figure 5:
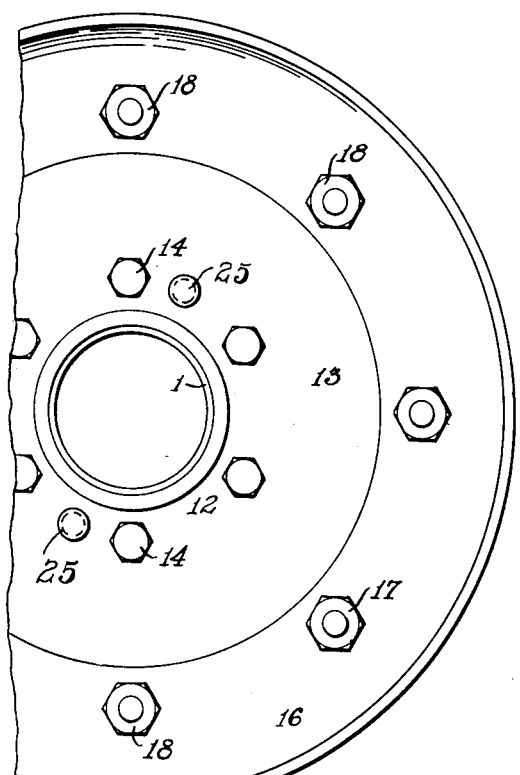
Figure 6:
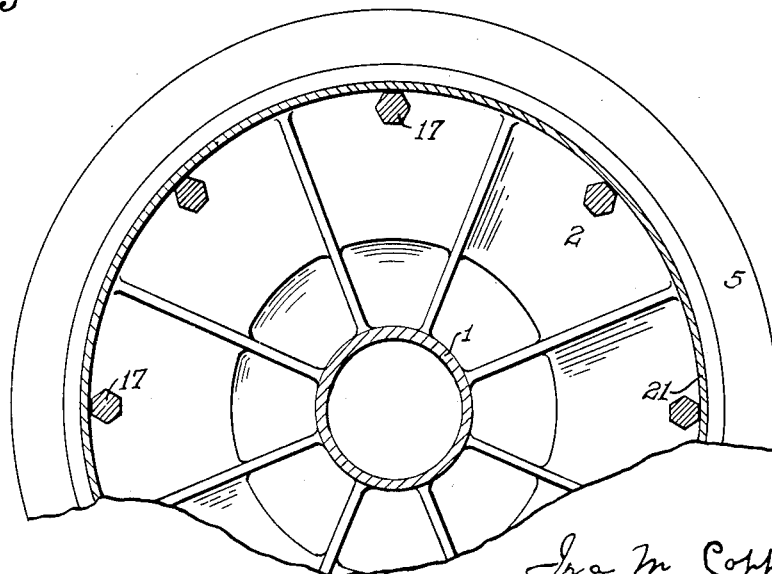

In the accompanying drawings illustrating my invention, Figure 1 is a longitudinal sectional view taken through the wheel. Figure 2 is a view of the outer end of the wheel, showing the streamline disc in place. Figure 3 is a detail view of the means for locking the streamline disc in place. Figure 4 is a partial view of the inner end of the hub, showing the brake drum. Figure 5 is a partial view of the outer end of the hub. And Figure 6 is a cross sectional view taken through the wheel, showing how the hex studs engage the inner surface of the ring to prevent them from slipping.

Referring to the accompanying drawings for a detailed description of my invention, the numeral 1 designates the hub of an airplane wheel casting preferably constructed of an aluminum alloy. The hub is formed at its inner end with a radial extension flange 2 whose middle part is straight. The latter terminates in a flat peripheral portion 3 that ends in a recess formed in an outwardly inclined part 4. This part 4 of the hub extension 2 integrally supports an inner flanged ring 5.

Formed in the outer surface of the straight part of the hub extension 2 is an annular ledge 6. Adapted to be inserted in the hollow inner portion of the wheel is a brake drum 7 whose radial flange portion 8 seats against the ledge 6 and whose curved periphery rests against the inner edge portion of the integral ring 5. By means of studs 9 the brake drum 7 is secured to the straight portion of the hub extension 2.

Formed in the hub casting between the parts 4 and 5 is an annular space 10 that forms an air pocket to prevent the transfer of heat from the brake drum 7 to the inner tube (not shown) of the tire which the wheel receives. (See Figure 1.) By thus insulating the brake drum from the tire, there is no danger of the inner tube being burned by the heat generated through contact of the brake shoes with the drum. The latter may also be easily removed for replacement or repair by unscrewing the studs 9.

Formed on the outer end of the hub 1 is a short annular flange 11 to which the offset inner edge portion 12 of a radially disposed disc 13 is secured by studs 14. Near its outer edge portion the disc 13 is offset to provide an annular ledge 15 to form a seat for an outer flanged rim 16.

The latter is secured to the disc 13 by through hex bolts 17 whose inner reduced threaded ends are screwed into tapped holes in the inner hub extension 2. To the outer ends of these bolts 17 shouldered nuts 18 are applied, the shoulders on the nuts fitting in recesses formed in the outer rim 16. (See Figure 1.)

The disc 15 is formed at its outer edge portion with an inwardly projecting horizontal ledge 19 that is slightly under a horizontal flange 20 on the rim 16 to receive the outer edge portion of a flat cylindrical rim 21. The inner edge portion of this flat rim is fitted in the recess in the outwardly inclined part 4 of the hub extension 2. When the flat rim 21 is applied to the wheel, its inner surface will contact the flat hex portions of the bolts 17 to prevent them from turning.

A streamline cover disc 22 is easily secured to the outer face portion of the wheel by the following means. Referring to Figures 1 and 2, there are formed in the middle portion of the disc 22, two T slots 23 and 24, one being the same distance from the center as the other. Fitted into each one of these T slots is the grooved head 25 of a stud 26. (See Figure 3.) These studs are adapted to be screwed into tapped holes in the offset portion 12 of the disc 13.

The streamline disc 22 is applied to the wheel by fitting the head portions of the slots 23 and 24 over the grooved heads of the studs 26 and then turning the said disc a sufficient distance to bring the heads of said studs to the inner ends of the straight portions of said slots.

To hold the head of the studs 26 in the bottom of the T slots 23 and 24, I provide spring arms 27, one for each slot. Each arm is pivotally secured, by a rivet 28, to the cover disc 22 at a point which will permit the arm to be turned to engage a circular plug 29 which it carries, in the head portion of the T slot occupied by the grooved head of the stud. When the T slots contain the plugs 29, the streamline cover disc 22 will be firmly secured to the wheel by the studs 26, since the grooved heads 25 of the latter cannot move out of the narrow portions of those slots until the plugs are lifted from their head portions.

It is thus seen that I have provided a streamlined airplane wheel which is easily assembled and disassembled for repair, and which contains an insertible brake drum which is heat insulated from the inner tube of the tire by an air pocket formed in the inner hub extension.

Having described my invention, I claim:

An airplane wheel comprising a hub, a radial rim support on said hub, a streamline disc formed with T slots, studs on said rim support for entrance into said T slots, spring arms pivoted to said disc near said slots, and plugs carried by said arms for entrance into the heads of said T slots when the studs are in the narrow portions of said slots.

IRA M. COPPOCK.